CLAMP

Filed Aug. 21, 1947

WITNESSES:
E. A. McCloskey
F. E. Browder

INVENTORS
Neville R. Ridgely, Jr.
and William H. Sohn.
BY
Hyman Diamond.
ATTORNEY Patented Feb. 27, 1951 2,543,740

UNITED STATES PATENT OFFICE 2,543,740

CLAMP

Neville R. Ridgely, Jr., and William Henry Sohn, Baltimore, Md., assignors, by mesne assignments, to the United States of America as represented by the Secretary of the Navy Application August 21, 1947, Serial No. 769,780

1 Claim. (Cl. 173—328)

This invention relates to the installation or mounting of electrical apparatus such as radio tubes, transformers, electrical motors, and the like, and more particularly to a clamp for retaining such apparatus firmly in position and also provide an electrical ground for the apparatus.

An object is to provide improved apparatus of this kind.

It is a further object to provide an improved mounting for electrical apparatus comprising a clamp which serves to retain the apparatus in position and also provide an electrical ground for the apparatus.

It is a still further object to provide a mounting for electrical apparatus comprising a clamp for retaining the apparatus in position which occupies substantially no more space than the apparatus.

It is a still further object to provide a mounting arrangement for electrical apparatus comprising a clamp which will open wide enough to permit easy removal and replacement of the apparatus.

It is a still further object to provide an improved mounting for electrical apparatus comprising a clamp which may be easily and quickly operated.

It is still a further object to provide an arrangement for mounting electrical apparatus comprising a clamp which retains the apparatus in position and also provides a plurality of electrical grounds for the apparatus.

These and other objects are effected by our invention as will be apparent from the following description and claims taken in accordance with the accompanying drawing, forming a part of the application in which:

Figures 1, 4, 5, 6:
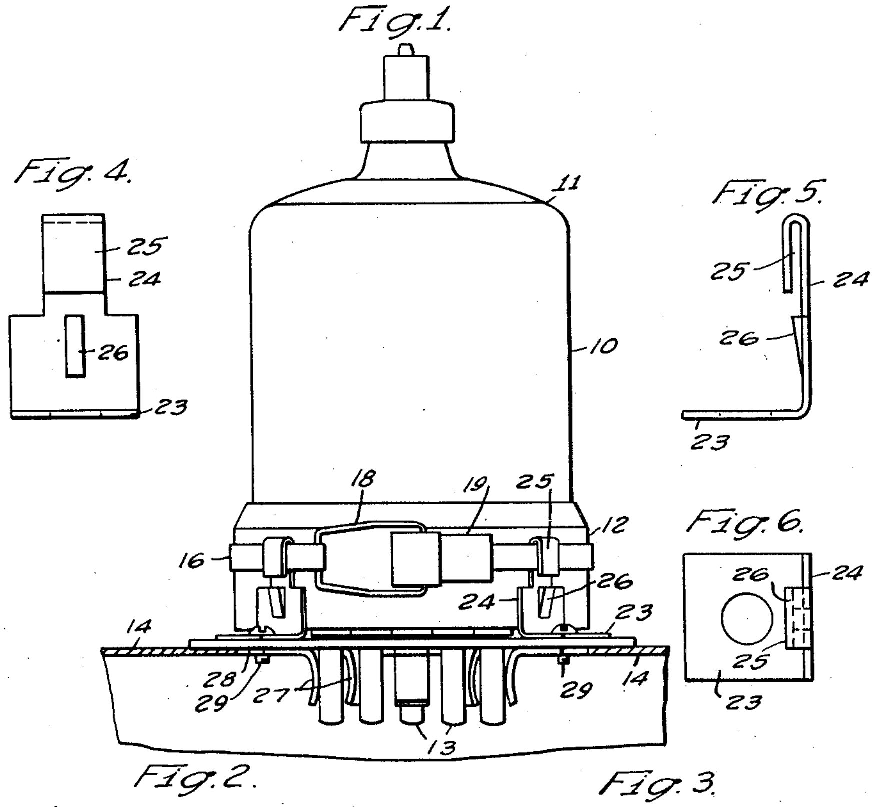
Figure 1 illustrates our invention being utilized for installing or mounting a high frequency radio transmitter tube in position on a chassis.
Fig. 4 is a view in front elevation of one of the feet or ground members shown in Fig. 2.
Fig. 5 is a side view of the apparatus shown in Fig. 4.
Fig. 6 is a top plan view of the apparatus shown in Fig. 4.

Referring to Fig. 1 in detail, we show our improved mounting arrangement applied to a high frequency radio transmitter tube 10. The tube 10 comprises the usual glass envelope 11, having a metal band 12 near its base, and having contact pins 13 extending through its base. The tube is shown mounted on a metal chassis 14 through which the contact pins 13 will normally extend to engage jacks, or other contact members 27 carried by a socket 28 on the underside of the chassis 14.

With tubes of this type, it is necessary that the metal band 12 be grounded and it should be connected to the chassis 14, or other ground, at a plurality of points. It is also necessary that the tube 10 be held securely in position especially in installations subject to excessive vibration, such, for example as on board ships, in airplanes, tanks, and trucks. In fact, these requirements are often included in specifications for this type of equipment, especially in Army and Navy specifications. Other requirements usually are that the clamping and grounding arrangements occupy substantially no more space than the apparatus and be easily operable by hand or with a small tool. Our invention provides a mounting comprising clamping device which satisfies all of the requirements very well.

Our clamp comprises an expansionable metal band 16, the ends of which are connected by an overcenter operating device 17 for opening and closing the band 16.

Figure 2:
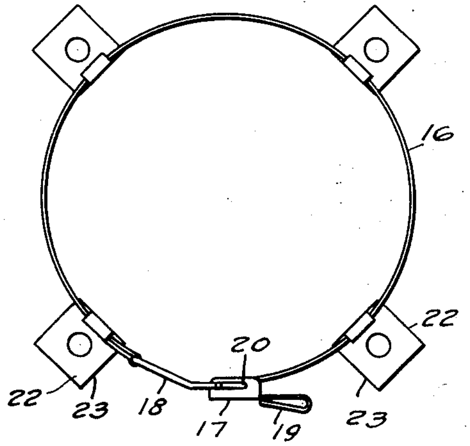
Fig. 2 is a top plan view of our improved clamp, showing the operating mechanism in closed position.

The operating device 17 includes a link member 18 attached to one end of the band 16 and a handle member 19 attached to the other end of the band 16; the handle 19 and link member 18 being connected at a point 20 intermediate the ends of the handle member 19. This arrangement provides an overcenter locking mechanism which, when moved to the closed position shown in Fig. 2, firmly clamps the band 16 about the metal band 12 of the tube 10. However, when the handle member 19 is moved to the open position shown in Fig. 3, the metal band 16 expands to permit easy removal of the tube. The handle member 19 may be readily manipulated by hand to open and close the band 16.

The band 16 is mounted on the chassis 14 by means of metal feet 22. These feet have a portion 23 for attaching them to the chassis 14 and a portion 24 substantially vertical to the portion 23. The portion 24 has U-shaped portion 25 formed at its upper end for attaching the feet to the band 16. A lug 26 is pressed out of the portion 24. This lug prevents the feet from becoming accidentally detached from the band 16, once they have been attached thereto.

The feet 22 are attached to the band 16 by snapping the U-shaped portions 25 over the band 16. The band 16 is attached to the chassis 14 by fastening the feet 22 to the chassis with screws, rivets, bolts, or any other suitable means as indicated by the reference character 29 in Fig. 1. It is understood that any desired number of feet 22 may be used to install the clamp. However, the number of feet 22 that will be used to mount the clamp will usually be determined by the number of ground connections required to electrically ground the apparatus. It will be observed that because of the particular character of the feet 22, the clamp occupies very little more space than the tube 10.

Figure 3:
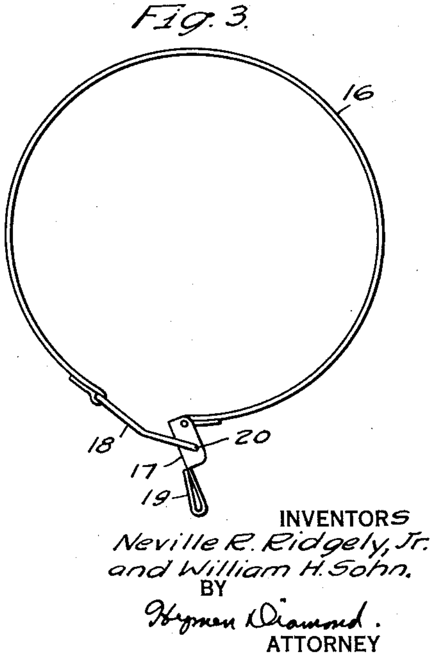
Fig. 3 is a top plan view of Fig. 2, with the feet or ground members omitted for clarity of illustration, showing the locking member in open position.

The U-shaped portions 25 are large enough to permit the band 16 to slide freely within them, when the operating device 17 is in its open position, as indicated in Fig. 3, to permit the handle 19 to be moved to a position where it may be easily operated. Electrical connection between the feet 22, the metal band 12 of the tube 10, and the metal band 16 of the clamp is provided by compression contact between the three elements when the operating device 17 is in closed position.

Although we have just described our invention for mounting a high frequency transmitter tube 10 in a vertical position, it will be understood that it may also be used to mount the tube 10 in an inverted position on the underside of the chassis 14, or in a horizontal position, or in any other position in which it is desired to operate the tube 10. It will also be understood that our invention may also be used to mount other electrical apparatus which must be held securely in position and which requires electrical grounding, such as, transformers, condensers, motors, and the like.

Although we show, the overcenter operating mechanism 17 for opening and closing the clamping band 16, it is understood that any suitable operating mechanism may be utilized, such as a bolt and a wing nut engaging a pair of lugs on the band 16, or any other mechanism that is desired.

From the foregoing description it is seen that we have provided an improved mounting arrangement for electrical apparatus comprising a clamp which holds the apparatus firmly in position and also provides electrical grounding for the apparatus, said clamp occupying little more space than the electrical apparatus and being easy to operate.

While we have shown our invention in only one form, it will be obvious to those skilled in the art that it is not so limited, but is susceptible of various changes and modifications without departing from the spirit and scope thereof, and we desire, therefore, that only such limitations shall be placed thereon as are specifically set forth in the appended claims.

We claim as our invention:

In a clamp for securing electrical apparatus in position, an expansible metal band, means for causing said band to contract and engage said apparatus or to expand and permit easy removal of said apparatus, a plurality of feet for mounting said band, means attaching said feet to said band comprising a U-shaped portion on each of said feet for receiving said band, and means for preventing said band from becoming disengaged from said U-shaped portions comprising a lug formed on each of said feet below and adjacent each of said U-shaped portions, said feet being movable with respect to each other along said band.

NEVILLE R. RIDGELY, Jr.
WILLIAM HENRY SOHN.

REFERENCES CITED

The following references are of record in the file of this patent:

UNITED STATES PATENTS

| Number | Name | Date |
|---|---|---|
| 1,523,893 | Pitard | Jan. 20, 1925 |
| 2,392,410 | Reinschmidt | Jan. 8, 1946 |
| 2,441,420 | Karlin | May 11, 1948 |

FOREIGN PATENTS

| Number | Country | Date |
|---|---|---|
| 397,305 | England | Aug. 24, 1933 |
| 625,392 | France | Apr. 23, 1927 |